No. 766,714. PATENTED AUG. 2, 1904.
J. LOWRY.
SPIKE MAKING MACHINE.
APPLICATION FILED MAR. 19, 1902.
NO MODEL. 8 SHEETS—SHEET 7.
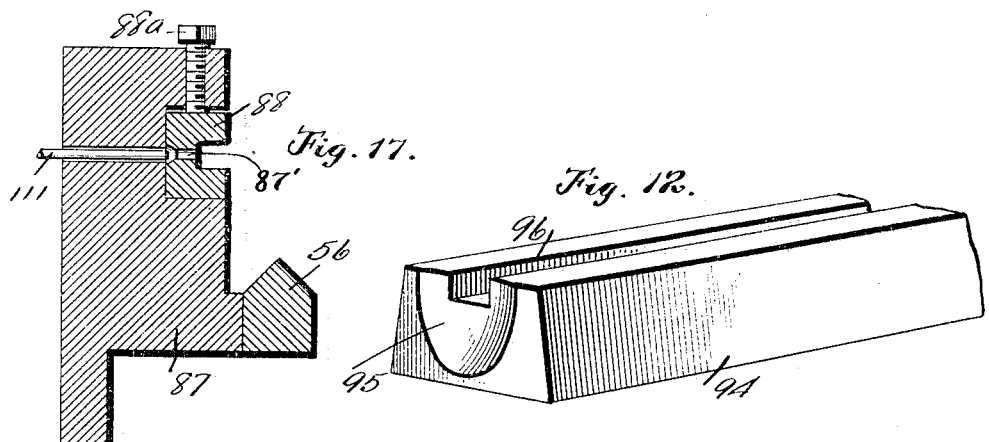
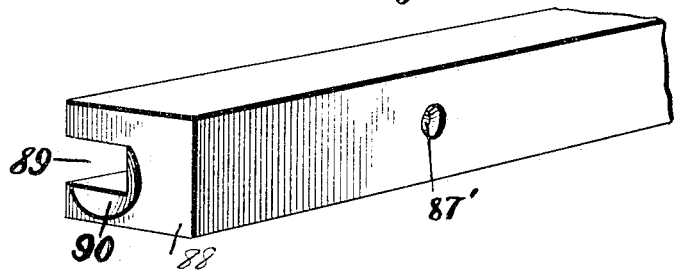
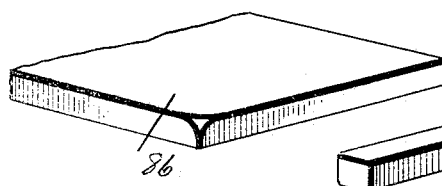 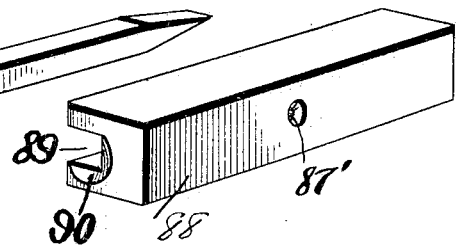
WITNESSES:
Wm F. Doyle
John S. Powers
INVENTOR
James Lowry.
BY
Attorneys No. 766,714. PATENTED AUG. 2, 1904.
J. LOWRY.
SPIKE MAKING MACHINE.
APPLICATION FILED MAR. 19, 1902.
NO MODEL. 8 SHEETS—SHEET 8.
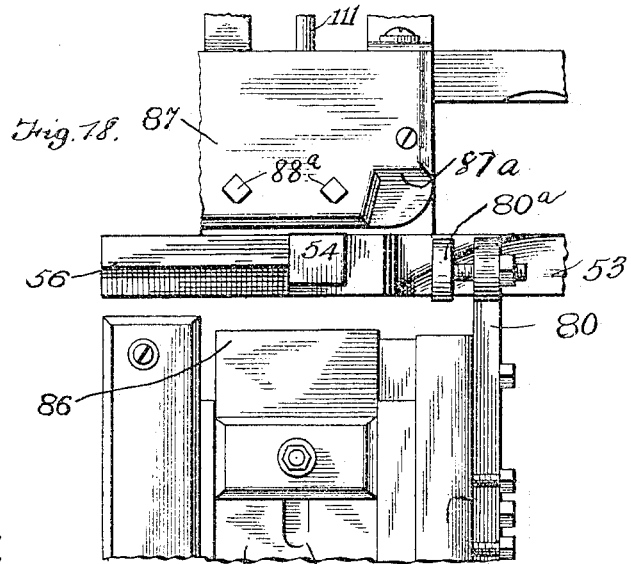
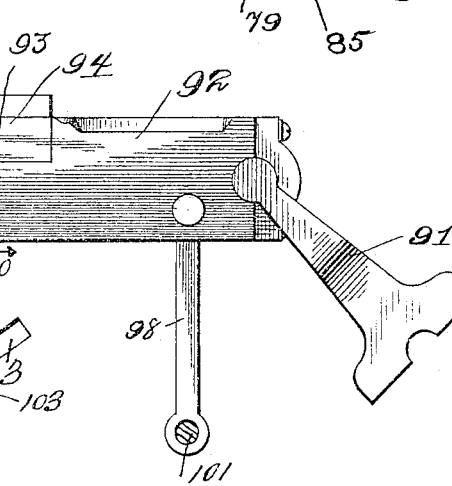
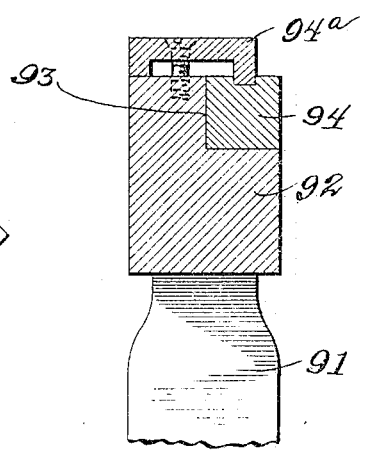
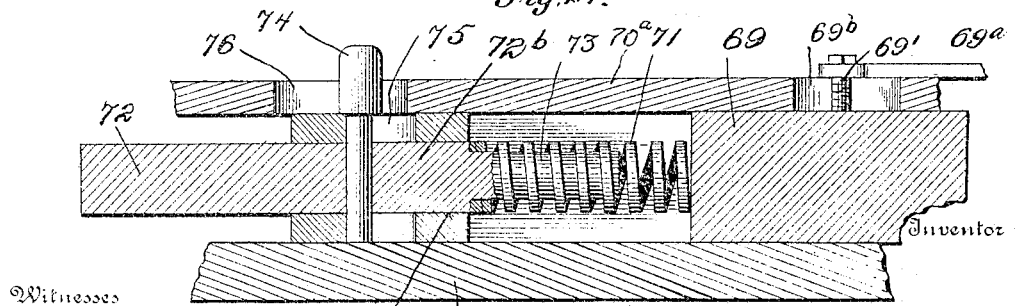
Witnesses
R. A. Boswell
Stephen H. Brooks
Inventor
James Lowry.
By H. C. Evert & Co.
Attorneys No. 766,714. Patented August 2, 1904.

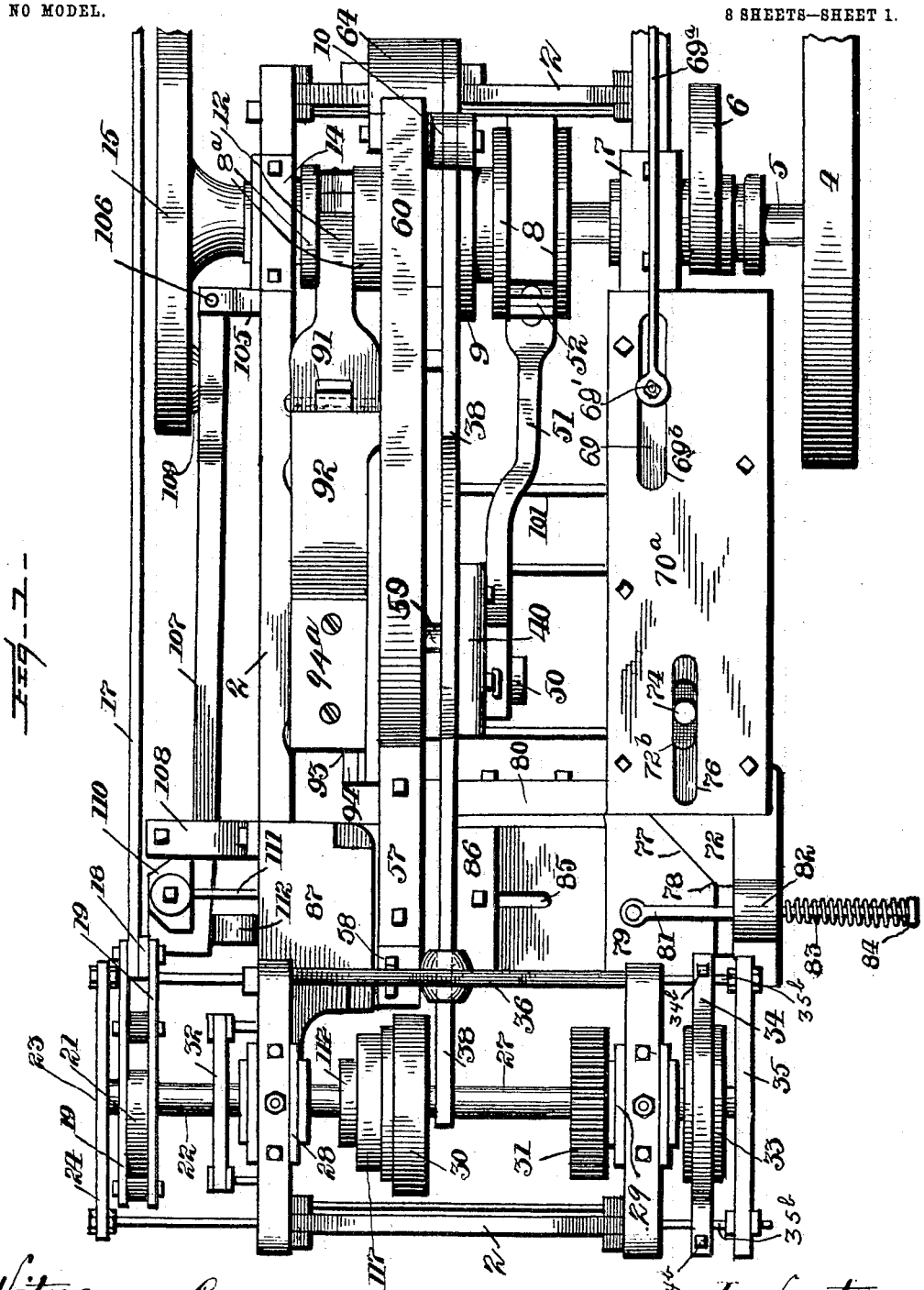

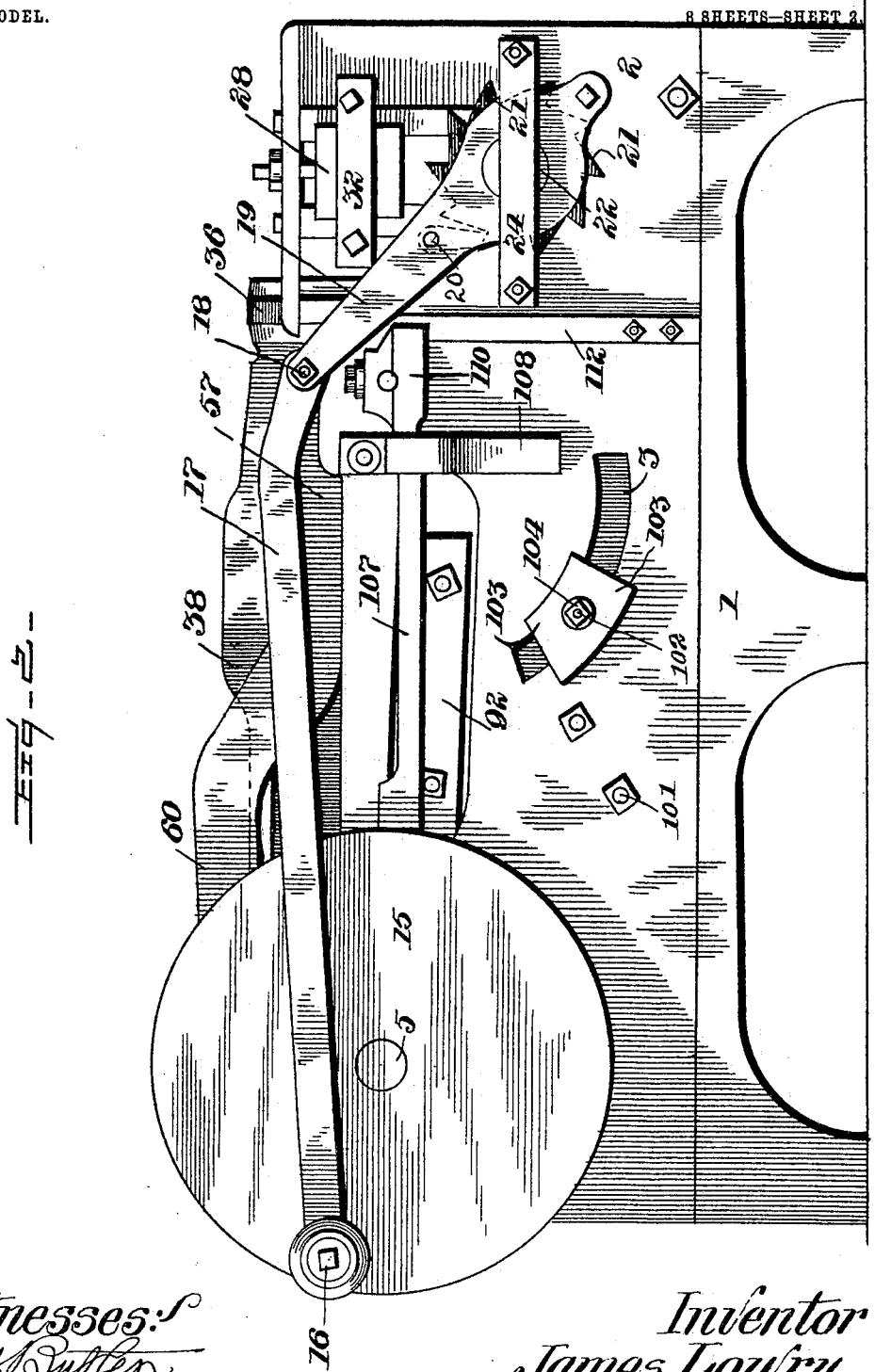

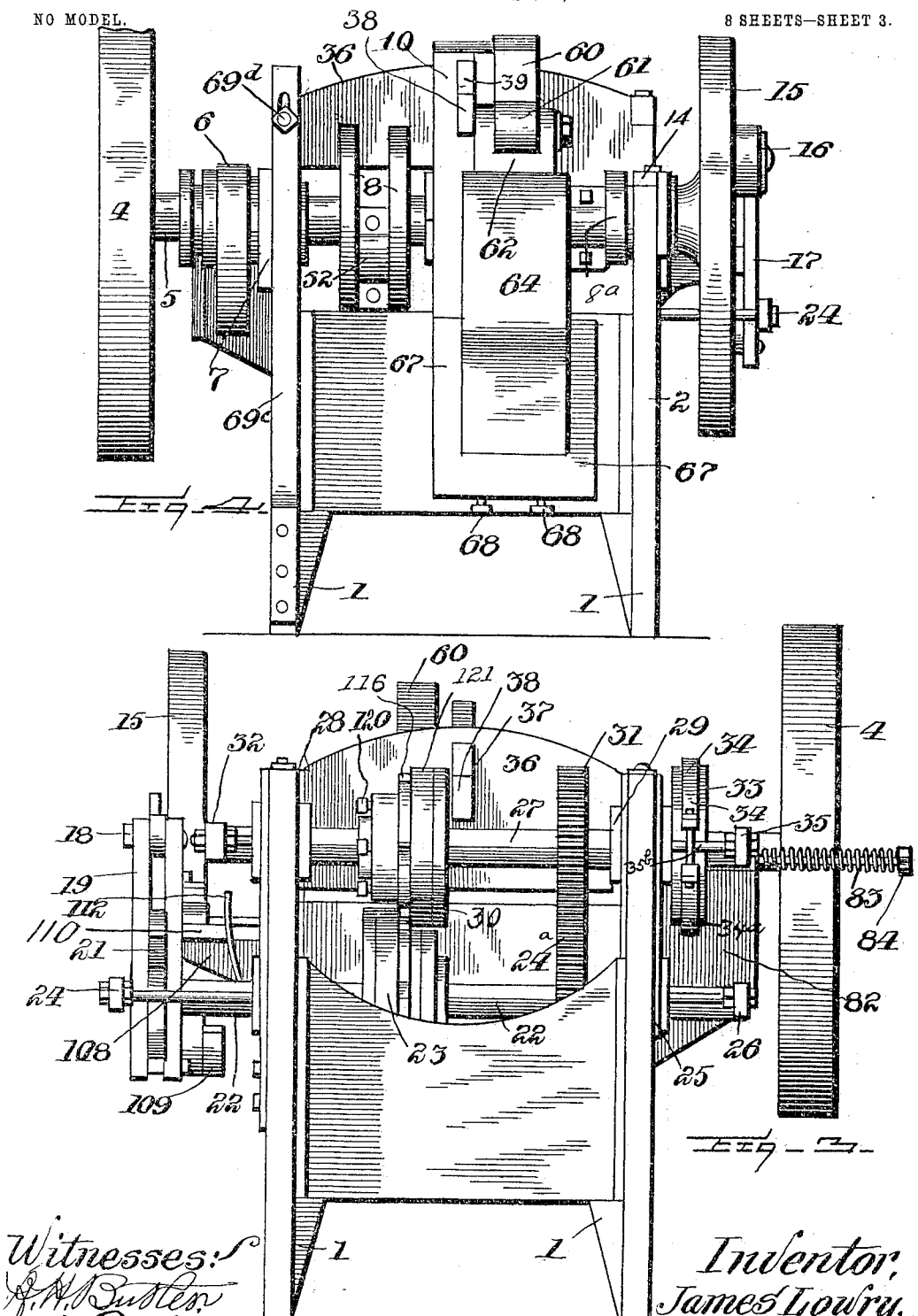

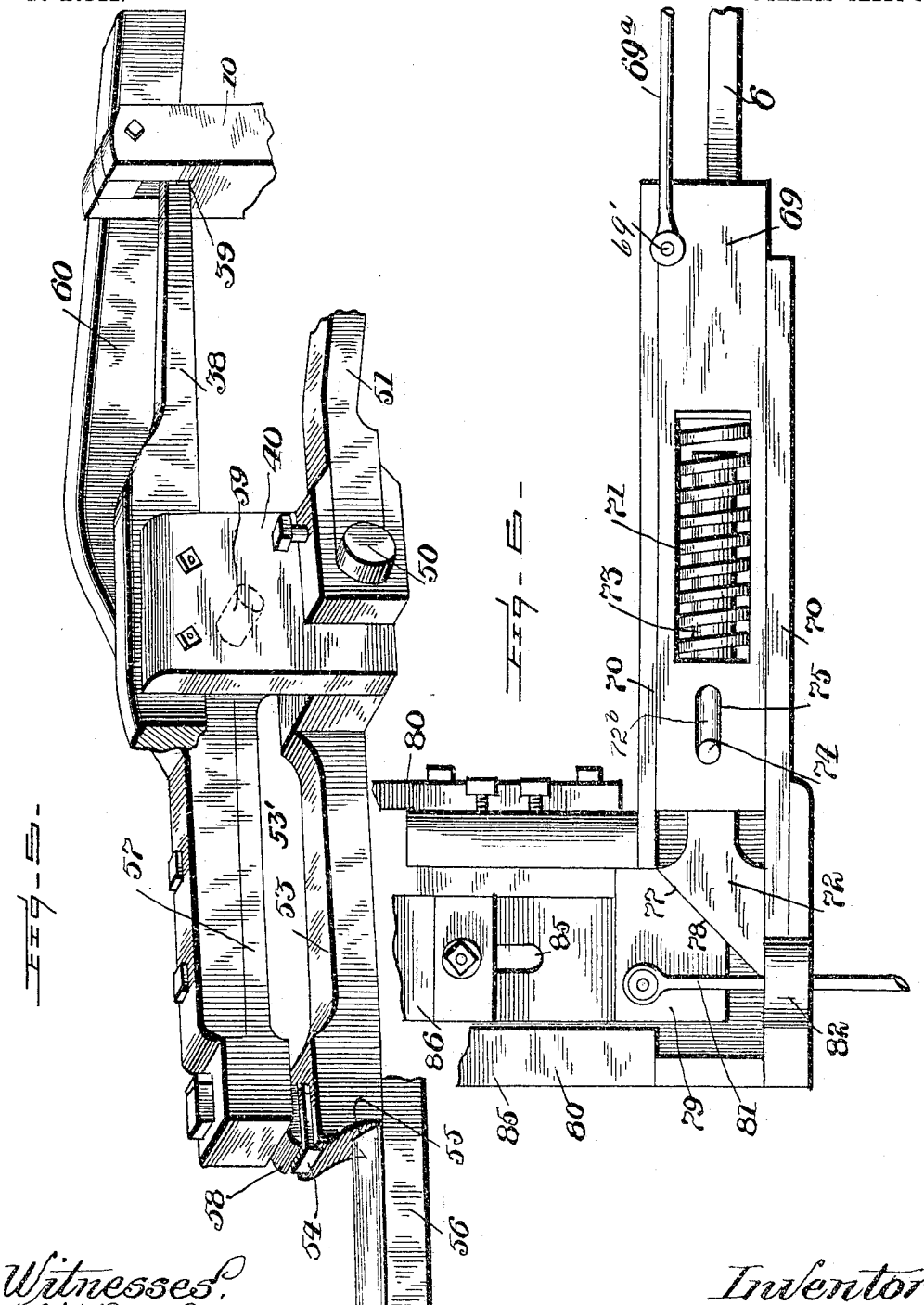

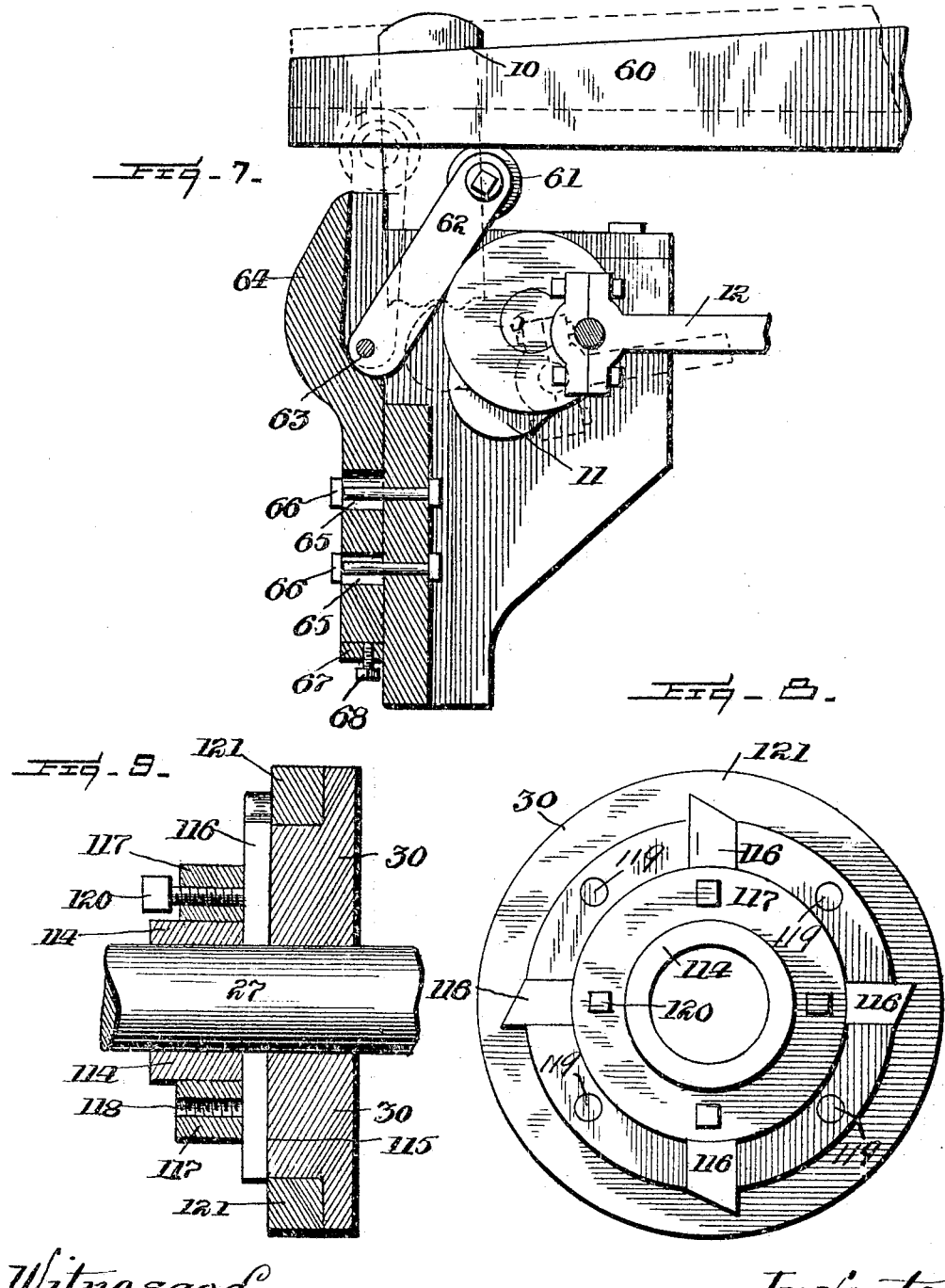

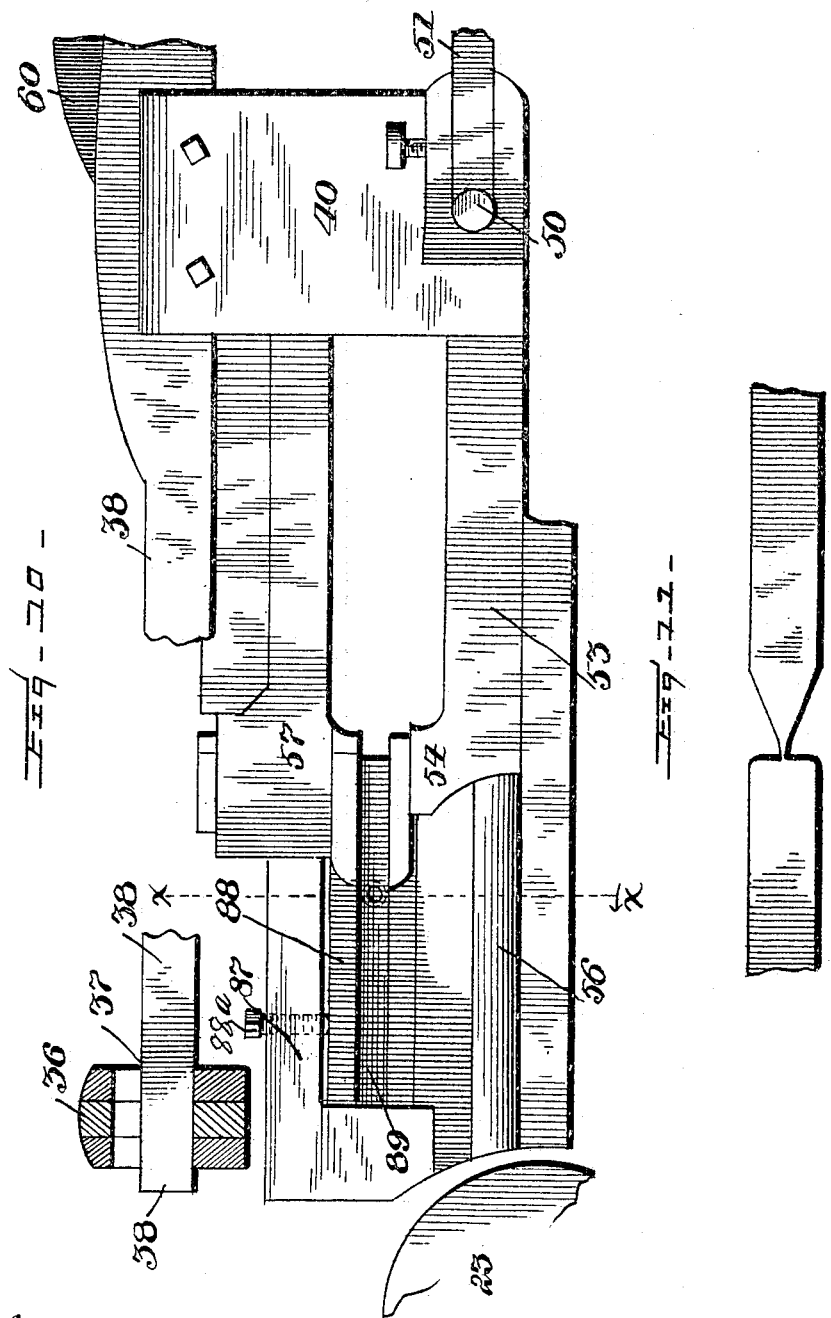

UNITED STATES PATENT OFFICE.

JAMES LOWRY, OF OAK STATION, PENNSYLVANIA.

SPIKE-MAKING MACHINE.

SPECIFICATION forming part of Letters Patent No. 766,714, dated August 2, 1904.

Application filed March 19, 1902. Serial No. 98,900. (No model.)

*To all whom it may concern:*

Be it known that I, JAMES LOWRY, a citizen of the United States of America, residing at Oak Station, in the county of Allegheny and State of Pennsylvania, have invented certain new and useful Improvements in Spike-Making Machines, of which the following is a specification, reference being had therein to the accompanying drawings.

This invention relates to certain new and useful improvements in spike-making machines in which a strip of metal is fed between two rolls carrying cutters which partially sever the strip into proper lengths and point the portions thus divided. By only partially severing the spike lengths or blanks from the strip there remains a thin connecting-web; and the primary object of my invention is to provide novel means for gripping the blanks on their upper and under faces, respectively, and carrying the same rearwardly, whereby the connecting-webs are broken.

A further object of the invention is to provide an improved means for removing the blanks from the gripping means and forcing the same into a header-die, during which operation any irregular bulging portions of the blanks are removed.

Further, the invention consists in providing a novel construction whereby to open the gripping-jaw and simultaneous therewith to move a means between the gripping means for forcing the spike-blanks laterally into a header-die wherein the final operations incident to the formation of the spikes are performed.

Finally, I provide a novel means for adjusting the header whereby the configuration of the spike-heads can be varied.

In describing the invention in detail reference is had to the accompanying drawings, in which like numerals of reference indicate like parts throughout the several views, in which—

Figure 1 is a top plan view of my improved spike-making machine. Fig. 2 is a side elevation thereof. Fig. 3 is a front view. Fig. 4 is a rear elevation. Fig. 5 is a perspective view of the means for conveying the spike-blanks rearwardly of the machine and the supporting means therefor, the latter being broken away. Fig. 6 is a top plan fragmentary view, with the top plate of the guide removed, of the mechanism for forcing the spike-blanks laterally into the header-die. Fig. 7 is a vertical sectional view, partly in side elevation, of the means for actuating the upper gripping-jaw, said means being illustrated in full lines in its inoperative position, the rear end of said jaw assuming its lowered position and in dotted lines in its operative position or position assumed during the gripping and conveying operation. Fig. 8 is a side elevation of one of the feed and forming rolls. Fig. 9 is a vertical sectional view thereof. Fig. 10 is a side elevation of the forward ends of the gripping-jaws, showing the relative positions of the die and stop and showing a portion of the lower feed and forming roll. Fig. 11 is a side elevation of a portion of the strip, showing the effect of the knives of the feed and forming rolls thereupon. Fig. 12 is a perspective view of the header-die. Fig. 13 is a similar view of the die in which the spike is retained during the operation of forming the head. Fig. 14 is a perspective view of the spike after having been operated upon by the plate shown in Fig. 16 before the operation of the heading-die. Fig. 15 is a perspective view, partly broken away, of the plate which forces the spike laterally into the die. Fig. 16 is a similar view of the die shown in Fig. 13, this view, in connection with Figs. 14 and 15, respectively, showing the relative positions of the plate, spike, and die. Fig. 17 is a section through the header-die and the adjacent jaw-supporting guide, taken on line $x\ x$ of Fig. 10. Fig. 18 is a fragmentary view in top plan view of the header-die casing and the laterally-moving plate which forces the spike thereinto. The gage which limits the rearward movement of the spike as it is conveyed from the feed and forming rolls between the casing and plate is also shown in this view. Fig. 19 is a view in side elevation of the header and its casing, together with the adjustable supporting means therefor. Fig. 20 is a vertical cross-sectional view taken on line 20 20 of Fig. 19. Fig. 21 is a vertical longitudinal sectional view of the slide which actuates the transversely-operating plates.

The frame of the machine comprises a base 1 and the side and end walls 2, which side walls are formed with segmental guideways 3. 5 indicates the driven shaft, provided with crank-arms 8 and 8$^a$ and being journaled in the frame-bearings 7, 9, and 14, respectively. On one of the ends of this shaft at a point beyond the side walls of the frame I mount a driven pulley 4 and a cam 6 and on the other end a wheel 15. The bearing 9 is carried by the standard 10, rigidly secured to the rear end wall of the frame. This driven shaft 5 also carries a cam 11. (See Fig. 7.) To the wheel 15 is pivotally secured at 16 a connecting-rod 17, which is also pivoted at 18 in the bifurcated lever-arms 19. These arms are loosely mounted on a shaft 22 and straddle a ratchet-wheel 21, keyed thereon. 20 indicates a gravity-pawl pivoted between said arms and adapted for engagement with said ratchet-wheel whereby an intermittent movement can be imparted thereto.

The shaft 22 is journaled in bearings 25 and carries the lower feed and forming roll 23 and a cog-wheel 24$^a$. 24 and 26 are brackets or guards for the projecting ends of this shaft. A similar shaft 27 is journaled in suitable bearings 28 and 29 in the frame of the machine, and this shaft carries the upper feed and forming roll 30 and the cog-wheel 31, which meshes with the cog-wheel 24$^a$, both cog-wheels being of like diameter. This shaft also projects beyond the side walls of the frame and has its ends inclosed by guards 32 and 35, respectively.

33 indicates a friction-disk mounted on one end of the shaft 27, and surrounding this disk is a friction-clutch comprising two semicircular bands 34 and 34$^a$, said bands having their ends projecting on opposite sides of the bolts 35$^b$, which support the guard or bracket 35, whereby they are held stationary. The ends of these bands are connected by bolts 34$^b$.

In the cross-head 36, which extends transversely of the machine and is secured to the frame side walls adjacent the bearings 28 and 29, is formed an opening 37, through which extends one end of a guide-arm 38. The other end of this guide-arm extends through an opening 39 in the upper end of the standard 10. It will be observed that while the end portions of this guide-arm are of unvarying width whereby they can readily slide in the openings 37 and 39 heretofore mentioned the central portion is enlarged, and to this enlarged portion I rigidly secure a depending plate 40, to which is pivoted at one side, as at 50, one end of a connecting-rod 51, the other end of said rod being pivotally secured at 52 to the crank-arm 8. On the opposite side of the plate 40 adjacent its lower edge is rigidly secured the lever-arm 53, carrying the lower gripping-jaw 54. In the under side of the lower gripping-arm 53 is formed a guideway 55, which rides upon the guide 56, to be more specifically referred to hereinafter. The upper gripping-arm 57 carries a jaw 58 and is pivoted at 59 to the plate 40 at a point above and on the same side as the arm 53. Both of these lever-arms are spaced from the plate 40, and I preferably form the pivot of the pivoted arm of such length that this arm is also spaced to one side of the guide-arm 38, whereby it will in its operation encounter no obstructions. The rear end of said lever 57 is extended, as at 60, so as to by gravity elevate or open the jaw 58. Against the under face of this extended portion or extension of the lever 57 bears an antifriction-roller 61, which is journaled in the upper end of the arm 62, the latter being pivotally secured at 63 in the adjustable bearing 64, having formed therein slots 65, through which extend bolts 66 for securing said bearing to the frame.

The adjustable bearing 64 is mounted in guideways 67 and is adjusted by means of the set-screws 68, thus providing means to elevate the extension 60, and thereby increase the gripping power of the jaw 58.

The cam 6, carried by the shaft 5, operates a slide 69, sliding in the guide 70, rigidly secured to one side wall of the frame. This slide 69 has its forward end formed with a longitudinal opening 72$^a$ in which the neck 72$^b$ of the head 72 is received. This neck terminates in a reduced stem 73, whereby a shoulder is formed therebetween, and said stem is encircled by a spring 71, which has its ends engaging said shoulder and the rear end wall of the slide, respectively. 69' indicates a pin secured to said slide and projecting through the opening 69$^b$ of the top plate 70$^a$ of the guide. To this pin is connected a rod 69$^a$, which extends rearwardly therefrom through a flat spring 69$^c$, the lower end of which is rigidly secured to the frame. A nut 69$^d$ is provided on the rear end of said rod. The neck of said head 72 carries a pin 74, which extends through a slot 75, formed in said slide and through the slot 76 in the top plate of the guide.

The spring 71 serves as a flexible connection to prevent the parts from breaking in case the machine should become clogged through an accident or by the displacement of a spike being placed into the heading-die.

The head 72 is formed with a beveled face 77, which engages a similar face 78 of the transversely-extending slide 79, operating in the guides 80, rigidly secured to the side wall of the frame. An adjustable stop 80$^a$ is carried by an arm secured to the rear guide 80 at a point adjacent its inner end and is adapted to limit the rearward movement of the spike. This stop, as stated, is adapted to limit the rearward movement of the spike-blank so as to properly position the same for insertion into the header-die. It acts on the spike-blank so as to limit its further movement by reason of the fact that after the gripping-jaws have severed the spike-blank from the stock and carry the said blank rearwardly the blank, though held, is not gripped tightly by the jaws at this time, owing to the jaws beginning to open, and consequently when the end of the spike-blank strikes stop 80ª the blank will be moved between the jaws, and the blank will thereby be properly positioned for delivery to the header-die. The transversely-extending slide 79 has secured thereto a rod 81, which extends through a bearing 82, carried by the side wall of the frame, and is provided on its projecting portion with a coil-spring 83, which is prevented from displacement by a nut 84.

In the slide 79 is formed a slot 85, in which is adjustably secured the plate 86, which serves to laterally force the spikes into the header-die.

The side wall of the frame opposite to the plate 86 has its inner face formed with an integral casing 87, in which a header-die 88 is secured by the set-screws 88ª. It will be observed that this casing has its inner face lying in proximity to the gripping-jaws when they occupy their rearward position and there is a considerable space between said plate 86 when in a retracted position and the jaws. This arrangement in the first instance is to prevent the blank from falling when it is being placed in the heading-die, and in the latter instance to permit of the spikes being ejected and deposited beneath the machine, the spikes in this operation being passed through opening 53' between the lever-arms 53 and 57 (see Fig. 5) at a point in the rear of the gripping-jaws.

The link 12, connected to the crank 8ª, has its inner end bifurcated, as at 91, and pivoted to a casing 92, said casing being formed with a seat 93, in which is received the header 94. This header has its forward end projecting beyond the casing and formed with a concave portion 95. The upper face of said header is formed with a groove 96, which is engaged by a clamping-plate 94ª, secured to the upper face of the casing 92 by suitable means, as illustrated.

98 and 99 indicate supporting-arms having their upper ends pivoted in the under face of the casing 92, the said arm 98 being pivotally secured to the rod 101, which connects the side walls of the frame. The other arm, 99, is shorter than the first-named arm and has its lower end pivoted to a rod 102, having its ends mounted in blocks 103 adjustable in the segmental openings 3. Nuts 104, carried on the ends of said rod, hold the blocks in predetermined positions. By adjusting these blocks the header can be operated at different angles, so as to vary the formation of the spike-heads.

105 indicates a bracket secured to the outer face of one side wall of the frame, in which is pivotally secured at 106 one end of a forwardly-extending lever-arm 107, the forward end of said arm projecting through a bracket 108, which is likewise secured to the frame side wall. The end of said arm in advance of the last-named bracket is enlarged, as at 110, to form a head, in which is secured a laterally-extending ejecting-rod 111, said rod being movable through the casing 87 and opening 87' in the die 88 for the purpose of ejecting the spike after the heading operation. This arm after having been moved inwardly through the action of the cam 109, carried by the wheel 15, is returned to its normal position by means of a flat spring 112, which has its lower end fixed to the frame and its free end bearing against the inner face of the head 110.

The feed and forming rolls 23 and 30 are respectively secured upon the shafts 22 and 27, and each are similarly constructed, the same comprising a body portion carrying an integral sleeve 114, which at a point adjacent its inner end is provided with lateral openings for the reception of radial cutters 116. A collar 117 is mounted on this sleeve and secured thereon by means of bolts 119, which extend entirely through the body portion of the roll.

120 indicates set-screws mounted in the openings 118 of the ring for securing the cutters in position, and 121 indicates a removable bearing-ring seated in an annular recess formed in the body portion of the roll, and against this ring snugly fit the outer ends of the cutters.

The casing 87 has its top cut away, as at 87ª, and the header 94 is adapted when reaching the limit of its forward movement to pass therethrough and engage and compress the projecting portion of the spike-blank, from which the head is to be formed, into the concave portion of the die.

The operation is as follows: Power being applied to the driven pulley 4, the wheel 15 thus rotated, an oscillatory movement through the medium of the connecting-rod 17 will be imparted through the lever-arms 19, carrying a gravity-pawl 20, which engages the ratchet-wheel 21, mounted on the shaft 22, and thus intermittently moving the same, which movement is likewise imparted to the upper and lower feed and forming rolls through the medium of the cog-wheels 24ª and 31, carried by the shafts 22 and 27, respectively. As the strip of metal from which the spikes are formed is fed between the rolls 23 and 30 the point of the spike is formed in a manner as shown in Fig. 11 of the drawings. I have found in practice that the passes between the rolls cannot be made of such dimensions as to prevent a spreading of the metal when acted upon by the cutters, and it is therefore obvious that unless some subsequent means is provided for resetting the upset metal an imperfect spike will be produced. I overcome this objection by providing a plate which is of approximately the width of the body portion of the spike, and as the spike-blanks are drawn rearwardly and severed from the strip of metal by the gripping-jaws carried by the slidable guide-arm 38 said plate passes between the jaws, the same upon reaching the limit of their rearward movement being completely opened, and forces the spike-blank into the heading-die and tightly clamps the same therein until the blank has been headed, whereupon the ejector-rod 111 forces the finished spike between the lever-arm 53 and 57 at a point in the rear of the gripping-jaws, and thus allowing the spike to fall downwardly under the machine into a suitable receptacle. The gripping-jaws are moved forwardly simultaneously with the rotation of the feed and forming rolls with the upper jaw opened, so as to permit of the reception of the blank therebetween, whereupon the spike is engaged on its upper and under faces, the upper jaw being closed by the raising of the extension 60 by means of the arm 62, which is operated by the cam 11, carried by the shaft 5. The rearward movement of the gripping arms and jaws is then accomplished through the medium of the crank 8 and the connecting-rod 51. The rolls which operate against the braking action of the friction-clutch 34 firmly clamp the metal while the gripping-jaws sever the spike at the web portion, and as the blank is conveyed rearwardly to a point in horizontal alinement with the plate 86 the upper gripping-lever 57 is automatically released from engagement with the upper face of the spike by means of the cam 11 passing over the point of engagement with the arm 62, which allows the end 60 of the lever 57 to drop by gravity. At this point the cam 6 will engage the slide 69 and operate the same inwardly, so that the beveled face of the head 72 will engage the corresponding face of the slide 79, and thus move the plate 68 laterally and force the spike into the die 88, as heretofore set forth. At this point of the operation the header is moved forwardly by means of the crank $8^a$ and the link 12, which is secured to the casing in which the header is arranged. The action of the jaws in gripping the spike-blank and in releasing their grip therewith may be more readily understood by referring to Figs. 5 and 7 of the drawings. When the jaws 54 58 are moving forward to receive the stock therebetween, they are in the open position, due to the fact that cam 11 is out of engagement with arm 62, and the latter is consequently in the position shown in full lines in Fig. 7. As the jaws approach the limit of their forward movement (at which time the stock has entered between the jaws) the cam 11 has come into engagement with the arm 62, and under the action of this cam the arm 62 is moved to the vertical position, as shown in dotted lines in Fig. 7, thus elevating the free end of lever 60 and forcing the upper jaw 58, carried thereby, into firm engagement with the stock, gripping the latter between the upper and lower jaws. The engagement of cam 11 with arm 62 is such that the jaws are held in this closed position until they have moved a short distance of their rearward travel, (in practice about an inch or so,) whereby the spike-blank will be severed from the stock, and as the cam is passing out of engagement with the arm 62 the pressure against the arm is being relieved and the arm begins to recede, reaching its full-line position (shown in Fig. 7) after the cam has passed out of engagement therewith. Owing to the employment of the roller 61 on the upper end of this arm 62, it will be observed that friction between the upper end of the arm and lever 60 is relieved, and the arm being eccentrically pivoted it will recede by gravity as the cam 11 passes out of engagement therewith. By the time the arm 62 reaches its full-line position (shown in Fig. 7) the jaws are fully opened; but it is to be observed that the jaws have receded for a short distance after severing the spike-blank from the stock before beginning their opening movement, and consequently the spike-blank has been firmly seated on the lower jaw before the opening movement of the jaws begins, and, as heretofore stated, the upper jaw opening slowly as the cam 11 passes out of engagement with arm 62, the upper jaw is still exerting slight pressure on the spike-blank until the limit of open position of the jaws is approached, at which time they are approximately in position for the removal of the spike-blank, a slight further movement bringing the jaws to their fully-opened position, at which time plate 86 moves across and forces the spike-blank into the heading-die, as heretofore described. The spike-blank is therefore in no danger of becoming displaced from its position on the lower jaw, for, as heretofore stated, it is held firmly by the jaws after severing from the stock long enough to allow it to become firmly seated and is under slight pressure (gradually decreasing) during the major portion of its rearward travel, and no jar of the machine occurs after severance of the spike-blank from the stock until the plate 86 forces the spike-blank into the heading-die. As soon as the head is formed upon the spike the plate 86 will automatically release, being withdrawn by means of the spring 83 operating upon the rod 81, and the slide will assume its normal position through the medium of the rod $69^a$ and flat spring $69^c$ as soon as the cam 6 has moved out of engagement therewith.

In view of the foregoing description it will be obvious that as the header-die is withdrawn the gripping arms or jaws, which at the time of the formation of the head upon one spike-blank were in position to receive another blank from the feed and forming rolls, are operated simultaneously rearwardly, thereby finishing one spike and operating the consecutive spike rearwardly to a position where it is laterally fed into the die.

In practice I have found by employing a relatively fixed lower gripping-jaw that I obviate the necessity of employing a head-block for the reception of the spike-blanks as they are fed from the rolls, and, aside from this feature, it will be noted that the spike-blank will be at all times supported, and thus prevented from accidental displacement when the transversely-operating plate engages the same for forcing it into the heading-die.

The casing 87 has the guide 56 secured thereto in any desired manner, as shown in Fig. 17.

Having thus described my invention, I claim—

1. In a spike-making machine, in combination with the feed and forming rolls, a conveying means comprising arms, and gripping-jaws carried by said arms and engaging the spike-blank on its upper and under faces, a die arranged to one side thereof, said conveying means carrying the spike rearwardly to a point opposite the die, means passing between the arms of said conveying means for removing and forcing the spike into the die, and a header.

2. In a spike-making machine, the combination of the feed and forming rolls, a pair of longitudinally-movable gripping-jaws, one of said jaws bearing a fixed relation to the other, means whereby said jaws are opened, a die arranged to one side of said jaws, means for forcing the spike from said jaws into the said die, and a header.

3. In a spike-making machine, a header, and means for supporting the same, said means comprising a pair of pivoted arms, one of said arms being adjustable for inclining the said header at different angles.

4. In a spike-making machine, the combination with the frame formed with a segmental guide in one of its side walls, of the feed and forming means, a die, means for carrying the spike and forcing the same into the die, a header, and a pair of arms pivotally connected to said header at their upper ends, and having their lower ends, one connected to the frame, and the other adjustably supported in the said segmental guide of the frame.

5. In a spike-making machine, a conveying means comprising gripping-jaws, and means for opening and closing the same, in combination with a die arranged to one side of said jaws, a plate movable between said jaws when the same are opened for forcing the spike into the die, and a header.

6. In a spike-making machine, the combination with the feed and forming rolls, of means for gripping the spike on its lower and upper faces and carrying the same rearwardly, a die at one side of said means, and means for forcing the spike-blank into the die, said last-named means engaging one side of the spike-blank and being of the same length as the body of the spike, substantially as and for the purpose specified.

7. In a spike-making machine, the combination with the feed and forming means, of a pair of longitudinally-movable gripping-jaws mounted one above the other, a die arranged to one side of said gripping-jaws, a laterally-movable plate and on the opposite side of said jaws, means for opening and closing said jaws, means whereby when the said jaws are opened the said plate will pass therebetween and force the spike into the die, and a header.

8. The combination with the frame, the driven shaft, and the feed and forming means, of a slidably-mounted guide-arm, a depending plate secured to said guide-arm, a rigid jaw secured to said plate a pivoted gripping-jaw carried by said plate and being formed with a rearward extension, an arm pivoted to the frame and adapted when in a raised position to engage the rearward extension of the said pivoted jaw for elevating the same, a cam on the said driven shaft for actuating the said last-named arm, means for reciprocating the said guide-arm, a die arranged to one side of the said jaws, a laterally-slidable means for forcing the spike into the die, and a header.

In testimony whereof I affix my signature in the presence of two witnesses.

JAMES LOWRY.

Witnesses:
JOHN NOLAND,
E. E. POTTER.